US011807038B2

(12) United States Patent
Merrill

(10) Patent No.: US 11,807,038 B2
(45) Date of Patent: Nov. 7, 2023

(54) TRAILER AXLES FOR WIDE BASE TIRES

(71) Applicants:Zachary Alexander Merrill, Greenville, SC (US); Compagnie Generale des Etablissements Michelin, Clermont-Ferrand (FR)

(72) Inventor: Zachary Alexander Merrill, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 639 days.

(21) Appl. No.: 17/046,141

(22) PCT Filed: Aug. 28, 2020

(86) PCT No.: PCT/US2020/048384
§ 371 (c)(1),
(2) Date: Oct. 8, 2020

(87) PCT Pub. No.: WO2022/046069
PCT Pub. Date: Mar. 3, 2022

(65) Prior Publication Data
US 2023/0150305 A1   May 18, 2023

(51) Int. Cl.
*B60B 35/06* (2006.01)
*B60C 9/20* (2006.01)

(52) U.S. Cl.
CPC ............... *B60B 35/06* (2013.01); *B60C 9/20* (2013.01)

(58) Field of Classification Search
CPC ..................................................... B60B 35/06
See application file for complete search history.

(56) References Cited

U.S. PATENT DOCUMENTS 10,124,829 B2    11/2018  Merrill
2018/0029414 A1*  2/2018  Khanfar .................. B60B 35/06

* cited by examiner

*Primary Examiner* — Kevin Hurley
(74) *Attorney, Agent, or Firm* — Neal P. Pierotti

(57) ABSTRACT

An apparatus (10) is provided, configured for use with a trailer (48) of a tractor trailer (44), that includes forward and rearward axles (12, 28) that each have a central body. The forward axle (12) has first and second mounting portions (16, 20) that are configured to receive first and second wide base tires (24, 26). The rearward axle (28) has first and second rearward mounting portions (32, 36) configured to receive third and fourth wide base tires (40, 42). The first forward mounting portion axis (18) is oriented at an angle (56) from +0.75-+0.95 degrees to the lateral direction, and the second forward mounting portion axis (22) is oriented at an angle (58) from +0.08-+0.28 degrees to the lateral direction. The first rearward mounting portion axis (34) is oriented at an angle (60) from +0.65-+0.85 degrees to the lateral direction, and the second rearward mounting portion axis (38) is oriented at an angle (62) from −0.05-+0.15 degrees to the lateral direction.

11 Claims, 6 Drawing Sheets

TRAILER AXLES FOR WIDE BASE TIRES

CROSS-REFERENCE TO RELATED APPLICATIONS

The present application is a 35 U.S.C. § 371 application of PCT/US20/48384 filed on Aug. 28, 2020 and entitled "Trailer Axles for Wide Base Tires." PCT/US20/48384 is incorporated by reference herein in its entirety for all purposes.

FIELD OF THE INVENTION

The subject matter of the present invention relates to axles for trailers utilizing wide base tires. More particularly, the present application involves forward and rearward axles on a trailer of a tractor trailer that have mounting portions that are angled relative to the lateral direction so that wear is improved on wide base tires mounted to the axles.

BACKGROUND OF THE INVENTION

Tractor trailers include a tractor that hauls a trailer filled with cargo. The trailer and drive tires of tractor trailers have tire positions that are outfitted with dual tires which are two tires side by side at that particular wheel end position. The steer tires at the front of the tractor are single width tires. It is known to replace the dual tires of the tractor and trailer with single wide base tires. In this regard, the two side by side tires are replaced with a single wide base tire that itself can handle the loading demands of the two side by side tires. The use of single wide base tires instead of dual tires can reduce fuel consumption of the tractor trailer because the rolling resistance generated by the two sidewalls of the single wide base tire is less than the rolling resistance generated by the four sidewalls of the dual tires. Also, the use of single wide base tires instead of duals reduces the overall weight of the wheel/tire assemblies of the tractor trailer which means more cargo can be moved on each trip the tractor trailer takes. Further, since extra tires from the dual sets are eliminated time and labor will be saved because the tractor trailer will have fewer tires to mount, demount, and pressure check. Experience has shown that single wide base tires may come out of service because of irregular (sometimes characterized as asymmetric) wear. A wide base tire that experiences irregular wear may have more tread wear near a shoulder of the tire and less tread wear at the center or opposite shoulder. This tire may be removed from service, although it could have lasted many more miles if the tread wear was more even over the entire width of the tread. Although the construction of wide base tires themselves has been modified to reduce the problem of irregular wear, it still remains the case that tires may have to come out of service early as a result of this issue. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
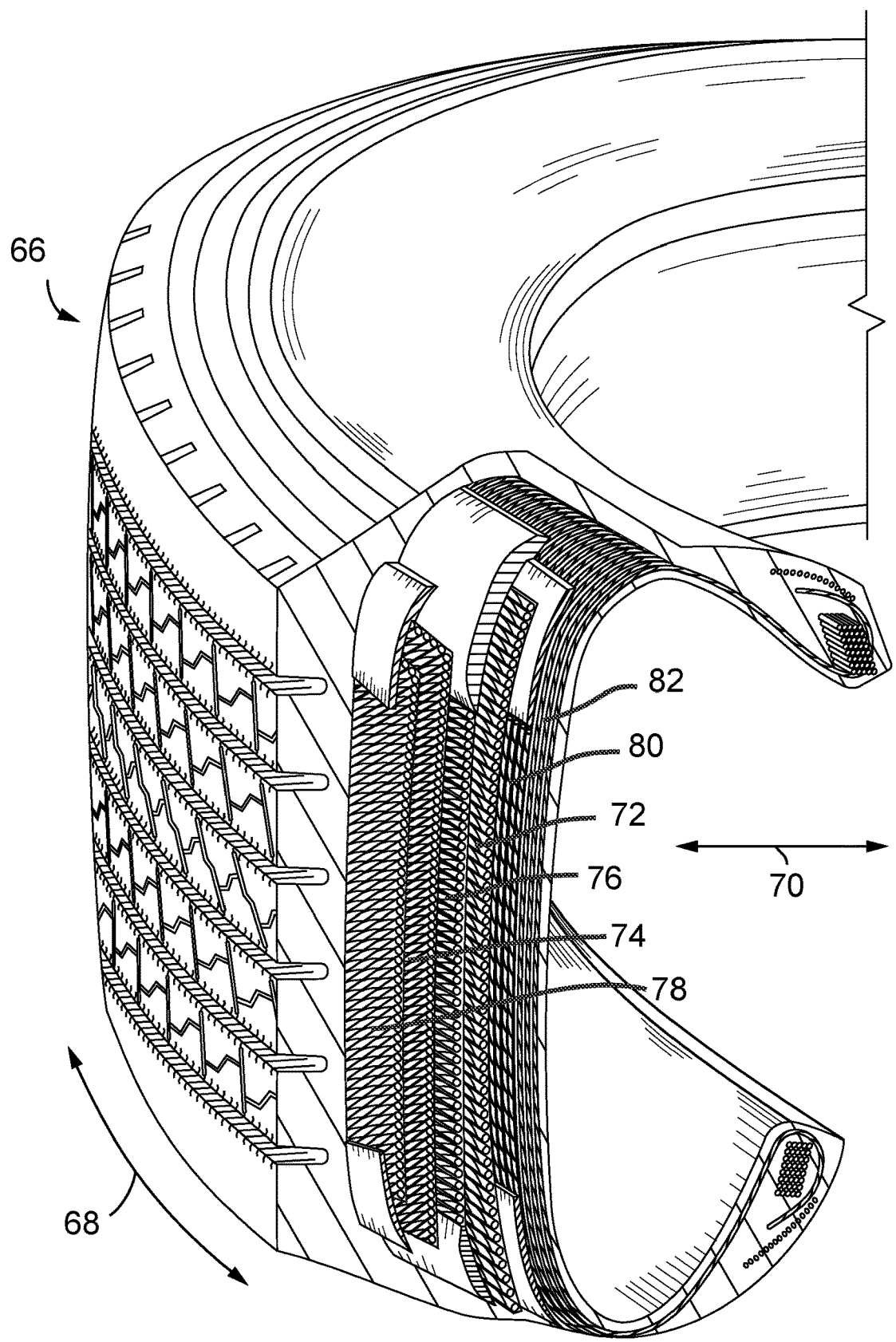
FIG. 1 is a perspective view of a wide base tire with a portion cut away to show various layers of the wide base tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 for a trailer 48 of a tractor trailer 44 that includes forward and rearward axles 12, 28 that carry wide base tires 24, 26, 40 and 42. The axles 12, 28 have mounting portions 16, 20, 32, 36 that are angled 56 58, 60, 62 with respect to the lateral direction 52. The angles 56, 58, 60, 62 are provided by the axles 12 and 28 and angle the wide base tires 24, 26, 40 and 42 so that the individual tires each wear more evenly to reduce irregular wear among them all. This reduction in irregular wear extends the life of the wide base tires 24, 26, 40 and 42 of the trailer 48.

A wide base tire 66 as shown in FIG. 1 is a truck tire that is capable of handling the load of two single truck tires commonly referred to as duals. The wide base tire 66 differs from duals in that this type of tire normally includes an extra reinforcing layer that strengthens and helps shape the tire 66 and thus allows the tire to be made wider and carry more loading. The wide base tire 66 shown in FIG. 1 is a MICHELIN® X ONE® tire provided by Michelin North America, Inc. having offices located at 1 Parkway South, Greenville, South Carolina, USA. The wide base tire 66 has a circumferential direction 68 that extends around an axis of the wide base tire 66 and thus extends in the direction of rotation of the tire 66, and a radial direction 70 that extends in the radial direction from this axis and is the direction from the inner liner of the tire 66 to the tread of the tire 66. The wide base tire 66 has a radial ply 82 that extends between the two beads of the tire 66. A full-width protector belt ply 80 is located radially outward from the radial ply 82. A first bias ply 72 is located outward from the full-width protector belt ply 80 in the radial direction 70 and includes cords that lay diagonally across the tire 66 so that they do not run completely in the circumferential direction 68. The belt package next includes the circumferential belt layer 76 that is outboard in the radial direction 70 from the first bias ply 72 and has cords that are angled at near 0 degrees to the circumferential direction 68 so that the cords extend completely in the circumferential direction. The inclusion of the circumferential belt layer 76 provides strength to the tire 66 to allow it to handle the extra loading and have the wider footprint indicative of a wide base tire.

The second bias ply 74 is located outward from the circumferential belt layer 76 in the radial direction 70 and has cords that are diagonal to the circumferential direction 68 so that they lay opposite in direction to those of the first bias ply 72. In this regard, the magnitudes of the angles the cords of the bias plies 72, 74 lay relative to the circumferential direction 76 are approximately the same, but their directions are opposite. The circumferential belt layer 76 is thus between two bias plies 72, 74 that has oppositely disposed cords. A third bias ply 78 is located outward from the second bias ply 74 in the radial direction 70 and has cords that lay diagonally relative to the circumferential direction 68 and can be in the same direction and could have the same magnitude as those of the second bias ply 74. Tread of the tire 66 may be located outboard from the third bias ply 78 in the radial direction 70, and the various layers 72, 74, 76, 78, 80, 82 make up a six-ply package to handle the extra loading required of a wide base tire 66.

The circumferential belt layer 76 tends to negate the effect of the first bias ply 72 pulling the tire 66 because the circumferential belt layer 76 is located outward from the first bias ply 72 in the radial direction 70. However, the second bias ply 74 is outward from the circumferential belt layer 76 and the directional force-generating effect of its biasing is not canceled by the circumferential belt layer 76. As a result, the tire 66 will exhibit ply steer in that the tire 66 will exhibit a lateral pulling force when in motion so as to move perpendicular to the radial direction 70. This lateral pulling force is leftward relative to the travel path of the vehicle. The third bias ply 78 has cords angled in the same direction as those of the second bias ply 74 and thus does not counteract the biasing forces. The wide base tire 66 used may be a ply steer tire 66 in that it pulls to one side in the lateral direction upon travel due to the construction of the belt package with the aforementioned plies 72, 74, 76, 78, 80, 82. This direction of travel exhibited by all of the MICHELIN® X ONE® wide base tires 66 on the trailer 48, and in some cases any wide base tire 66 on the trailer 48 and tractor 46 causes the tractor trailer 44 to want to pull to the middle of the road. Other types of wide base tires are known that do not include very much if any ply steer in that the bias plies are inward of the circumferential belt layer in the radial direction 70 so that any ply steer contribution by these bias plies is canceled out (or minimized) by the presence of the circumferential belt layer or some other technology.

Figure 2:
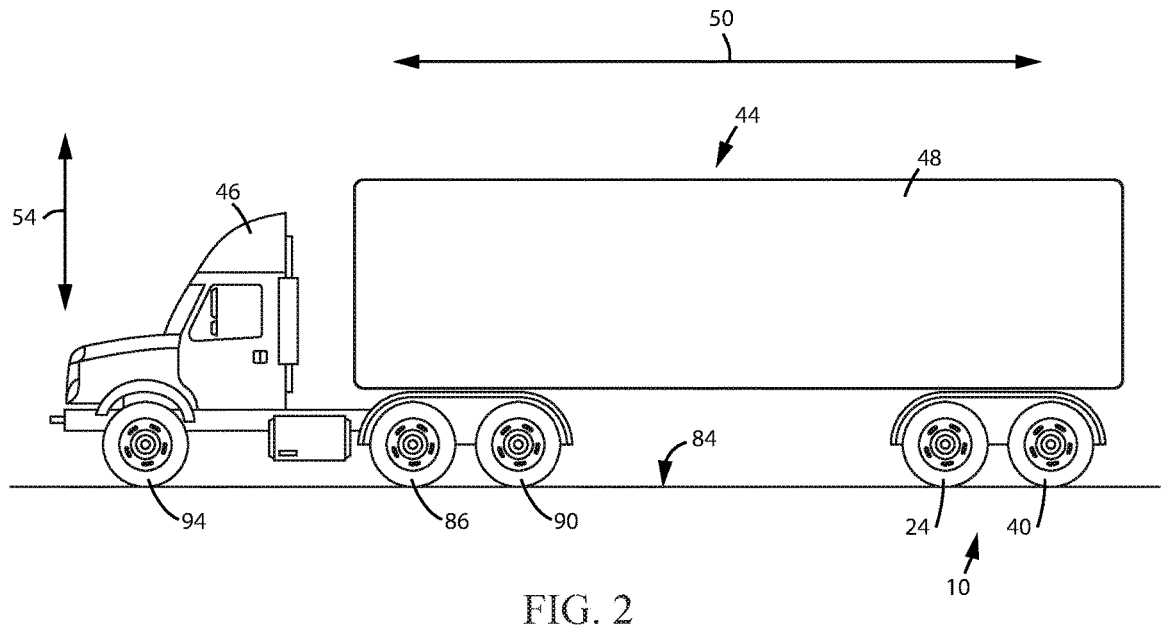
FIG. 2 is a side view of a tractor trailer.
Figure 3:
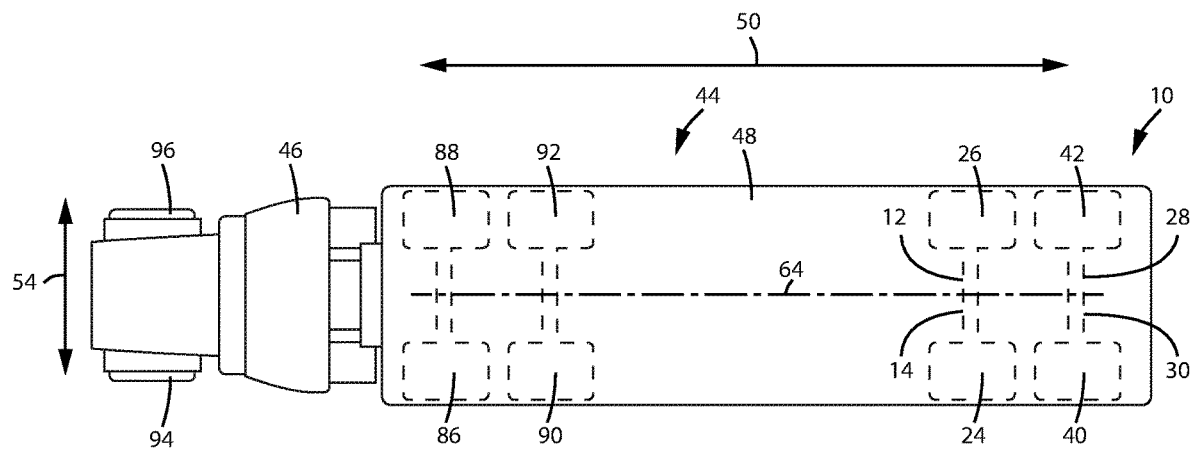
FIG. 3 is a top view of the tractor trailer of FIG. 2.

FIGS. 2 and 3 show a tractor trailer 44 that includes a tractor 46 that is attached to the trailer 48 and hauls the trailer 48 and cargo located therein. The tractor trailer unit 44 is sometimes referred to as a semi-trailer truck, a tractor trailer, an eighteen wheeler, a transport truck, or by other names. The tractor trailer 44 includes tires that are all heavy duty truck tires. In this regard, the tires described herein are not designed for nor used with a car, motorcycle, or light truck (payload capacity less than 4,000 pounds), but are instead designed for and used with heavy duty trucks such as 18 wheelers, garbage trucks, or box trucks. As such, in some embodiments the trailer 48 has a payload capacity of 4,000 pounds or greater. The tractor trailer unit 44 can include a single trailer 48 or the tractor trailer unit 44 may have two or three trailers 48 in other embodiments. The trailer 48 has a longitudinal direction 50 that is the forward and rearward directions of travel of the tractor trailer 44. The lateral direction 52 is the width direction of the trailer 48, and the vertical direction 54 of the trailer 48 is the up down direction of the trailer 48 relative to the ground 84 onto which the trailer 48 rests. The trailer 48 has a centerline 64 that goes through the middle of the trailer 48 in the lateral direction 52 such that half of the trailer 48 is on the left hand side of the centerline 64 and the other half is on the right hand side of the centerline 64.

The tractor 46 has a pair of steer tires 94, 96 located at its forward end in the longitudinal direction 50. The tractor 46 also has four drive tires 86, 88, 90 and 92 that transfer power from the engine to cause the tractor 46 to move. Other tractor 46 designs are known in which only one of the axles is a drive axle and the other is not a drive axle, and yet other tractor 46 designs are known in which but a single axle is at the back of the tractor 46 and it is a driven axle. The drive tires 86, 88, 90 and 92 are each wide base tires and not dual tires, but in other embodiments some or all of the drive tires 86, 88, 90 and 92 may be duals instead of wide base tires. The trailer 48 has a bogie assembly 10 that may include the forward axle 12 and rearward axle 28 in which the forward axle 12 is forward of the rearward axle 28 in the longitudinal direction 50. The forward axle 12 has first and second wide base tires 24, 26 and the rearward axle 28 has third and fourth wide base tires 40, 42. Although shown as having less than 18 tires, the tractor trailer 44 may still be referred to as an 18 wheeler since this term refers to vehicles of this type and configuration. The first wide base tire 24 occupies the forward left position on the trailer 48 and the second wide base tire 26 is at the forward right position. The third wide base tire 40 is at the back left position, and the fourth wide base tire 42 is at the back right position of the trailer 48.

The forward axle 12 and rearward axle 28 may be part of a bogie assembly. Also, the axles 12 and 28 can be part of a conventional tandem axle suspension system. The axles 12 and 28 can be spaced apart 4 feet from one another in the longitudinal direction 50. The apparatus 10 is not designed for use with the stated angles 56, 58, 60, 62 in which the axles 12 and 28 are spaced ten feet apart in the longitudinal direction 50. Axles that are spaced 10 feet apart in the longitudinal direction 50 are known as "spread axle tandems" and the present apparatus 10 does not incorporate these types of axles 12, 28. Instead, the axles 12, 28 used in the present apparatus 10 are spaced much closer to one another in the longitudinal direction 50 such as around being 4 feet.

Figure 4:
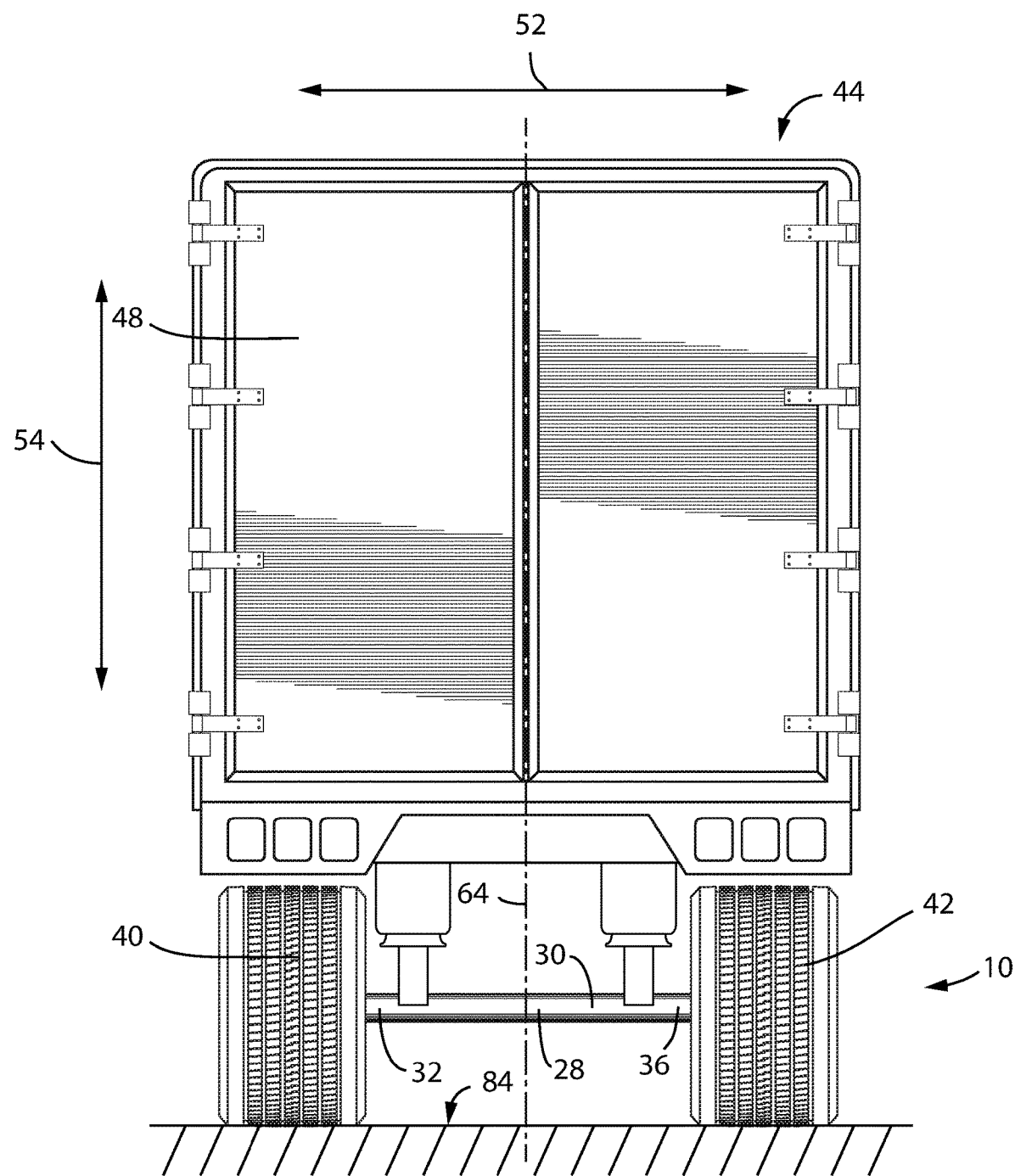
FIG. 4 is a back view of a tractor trailer.

A back view of the trailer 48 is shown with reference to FIG. 4. The rearward axle 28 is shown and the forward axle 12 is obscured from sight due to the rearward axle 28. The rearward axle 28 is attached to the bottom of the trailer 48 and has a suspension system associated therewith to reduce impact forces on the trailer 48. The rearward axle 28 carries the third and fourth wide base tires 40 and 42 and is angled such that the entire rearward axle 28 is not parallel to the ground 84. Instead, one or both of the ends of the rearward axle 28 are angled relative to the ground 84 such that both of the wide base tires 40 and 42 are not positioned with their axes parallel to the ground but instead one or more are angled relative thereto. Tires that do not have their axes parallel to the surface of the ground introduce camber into the vehicle which can cause the vehicle to pull to the side that has positive camber. Tires that have their axes parallel to the ground are said to have neutral camber. It is to be understood that some road surfaces are angled to allow water to drain therefrom, or because of the bank of the road. As such, when described as being vertical or angled relative to the lateral direction its to be understood that this reference is to the surface of the roadway/ground 84 that the vehicle rests upon and not necessarily to a completely vertical direction from the center of the earth upwards. For the purposes of discussion herein, we presume the "ground" 84 to be level and flat and not angled, crowned or curved. However, if the ground 84 is so in some instances the angles described are relative to this angled, crowned, or curved ground 84. The lateral direction 52 may be perpendicular to a surface normal extending from the ground 84, and in this regard the lateral direction 52 may be said to be parallel to the ground 84 and not at an angle to the ground 84.

Figure 5:
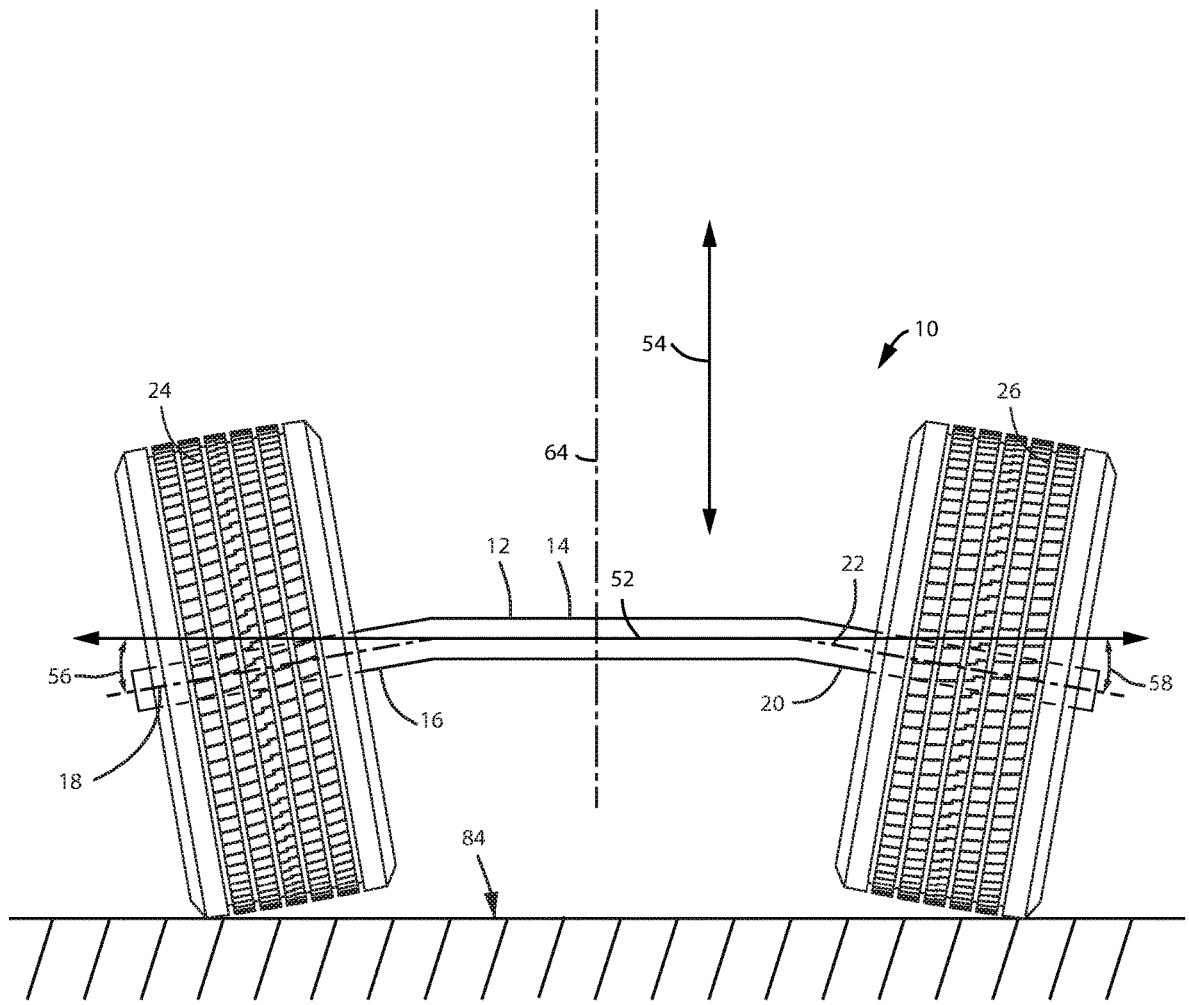
FIG. 5 is a back view of a forward axle of a trailer that has first and second wide base tires.

FIG. 5 is a rear view of the forward axle 12 of the trailer 48 looking from behind the forward axle 12 forward in the longitudinal direction 50. The forward axle 12 has a forward central body 14 through which the centerline 64 passes. The forward axle 12 may have a central axis that is parallel to the lateral direction 52. Outboard in the lateral direction 52 may be described with reference to the centerline 64 as being on one side of the trailer 48 and moving away from the centerline 64 in the lateral direction 52. Inboard in the lateral direction 52 may be described as moving toward the centerline 64 in the lateral direction 52 when viewed from one of the two sides of the trailer 48 in the lateral direction 52. A first forward mounting portion 16 extends from the forward central body 14, and the first wide base tire 24 is rotatably mounted to the first forward mounting portion 16. A hub, brakes and other components can be included as well but are not shown for sake of clarity. The first forward mounting portion 16 is angled relative to the ground 84 in the lateral direction 52, and is likewise angled relative to the forward central body 14. In this regard, the first forward mounting portion 16 has a component of extension downward in the vertical direction 54 upon extension away from the forward central body 14 outboard in the lateral direction 52. The first forward mounting portion 16 has a first forward mounting portion axis 18 that is oriented at an angle 56 to the lateral direction 52. The axis 18 extends through the center of the first forward mounting portion 16 which can be cylindrical, square, rectangular or have any cross-sectional shape. The angle 56 may be +0.75 to +0.95 degrees in some embodiments. In other embodiments, the angle 56 is +0.80 to +0.90 degrees, and in yet other embodiments the angle 56 is +0.85 degrees. The magnitude of the angle 56 is exaggerated in FIG. 5 and is not drawn to scale. This angle 56 is measured when the forward axle 12 is produced such that the weight of the trailer 48 is not loaded onto the forward axle 12. When the trailer 48 is fully loaded, this weight will push down onto the center of the forward axle 12 and cause it to bend which will in turn cause the tires 24 and 26 to bend so they have a lower camber angle and possibly even a negative camber angle. The angle 56 is set into the forward axle 12 before any loading is put onto the trailer 48, but is to be understood that when loading is applied to the trailer 48 that this will distort the angle 56 originally imparted into the forward axle 12.

The second forward mounting portion 20 extends outboard from the forward central body 14 in the lateral direction 52 and has a second forward mounting portion axis 22 that is located in the center of the second forward mounting portion 20. The second forward mounting portion 20 could have a circular, square, or rectangular cross-sectional shape. The second forward mounting portion 20 has a component of extension towards the ground 84 upon extending outboard in the lateral direction 52 from the forward central body 14. An angle 58 is defined between the second forward mounting portion axis 22 and the lateral direction 52. The angle 58 may be +0.08 to +0.28 degrees in some embodiments. In other embodiments, the angle 58 is +0.13 to +0.23 degrees and in other embodiments the angle 58 is +0.18 degrees. The angle 58 is set into the forward axle 12 before any loading is put onto the forward axle 12 such as by loading the trailer 48 onto which the forward axle 12 is mounted.

The first and second wide base tires 24, 26 are provided with positive camber via the angles 56, 58. In this regard, the tires 24, 26 are both angled relative to the ground 84 and extend outboard in the lateral direction 52 upon their extension upwards in the vertical direction 54 from the ground 84. The tops of the tires 24, 26 are located farther outboard in the lateral direction 52 than the bottoms of the tires 24, 26.

Figure 6:
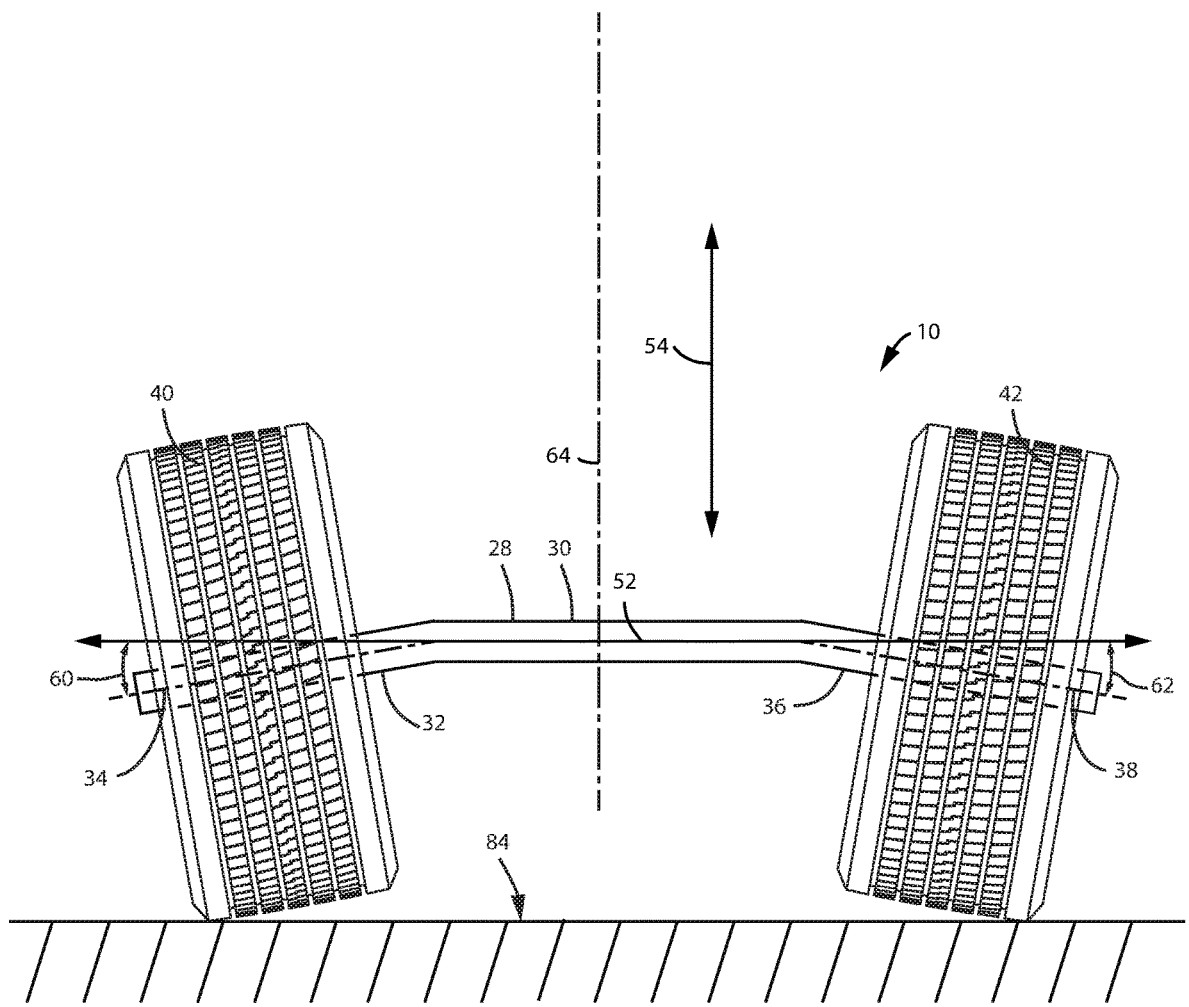
FIG. 6 is a back view of a rearward axle of a trailer that has third and fourth wide base tires.

The rearward axle 28 is shown in FIG. 6 which is a view from behind the rearward axle 28 looking forward in the longitudinal direction 50 of the trailer 48. The rearward axle 28 has a rearward central body 30 through which the centerline 64 is disposed. First and second rearward mounting portions 32 and 36 extend from opposite lateral ends of the rearward central body 30. The first rearward mounting portion 32 has a first rearward mounting portion axis 34 located in its center, and the second rearward mounting portion 36 has a second rearward mounting portion axis 38 located at its center. The mounting portions 32, 36 may have circular, rectangular, square, triangular, or irregular cross-sectional shapes and can be variously shaped in accordance with different exemplary embodiments.

Both of the first and second rearward mounting portion axes 34 and 38 extend downward in the vertical direction 54 upon their extension outboard in the lateral direction 52 from the rearward central body 30. An angle 60 is established between the first rearward mounting portion axis 34 and the lateral direction 52, and an angle 62 is established between the second rearward mounting portion axis 38 and the lateral direction 52. The third wide base tire 40 is located on the first rearward mounting portion 32, and the fourth wide base tire 42 is located on the second rearward mounting portion 36. The first rearward mounting portion 32 and the third wide base tire 40 occupy the back left tire position of the trailer 46, and the second rearward mounting portion 36 and fourth wide base tire 42 occupy the back right tire position of the trailer 48.

The angle 60 of the first rearward mounting portion axis 34 can be +0.65 to +0.85 degrees. In other embodiments, the angle 60 is +0.70 to +0.80 degrees, and in other embodiments the angle 60 is +0.75 degrees. The angle 62 between the second rearward mounting portion axis 38 and the lateral direction 52 can be from −0.05 to +015 degrees. In other embodiments the angle 62 is +0.00 to +0.10 degrees, and in other embodiments the angle 62 is +0.05 degrees. It is be understood that if the angle 62 is +0.00 degrees then the second rearward mounting portion axis 38 is parallel to the lateral direction 52. If the angle 62 is negative, then the second rearward mounting portion axis 38 has a component of extension upwards in the vertical direction 54 upon extension outboard in the lateral direction 52 from the rearward central body 30. The third and fourth wide base tires 40 and 42 can be angled relative to the lateral direction 52 via solely the angles 60 and 62, and when both of the angles 60 and 62 are positive the tires 40 and 42 can be said to have positive camber. The angles 60 and 62 shown in FIG. 6 are not to scale but are exaggerated for purposes of explanation.

Figure 7:
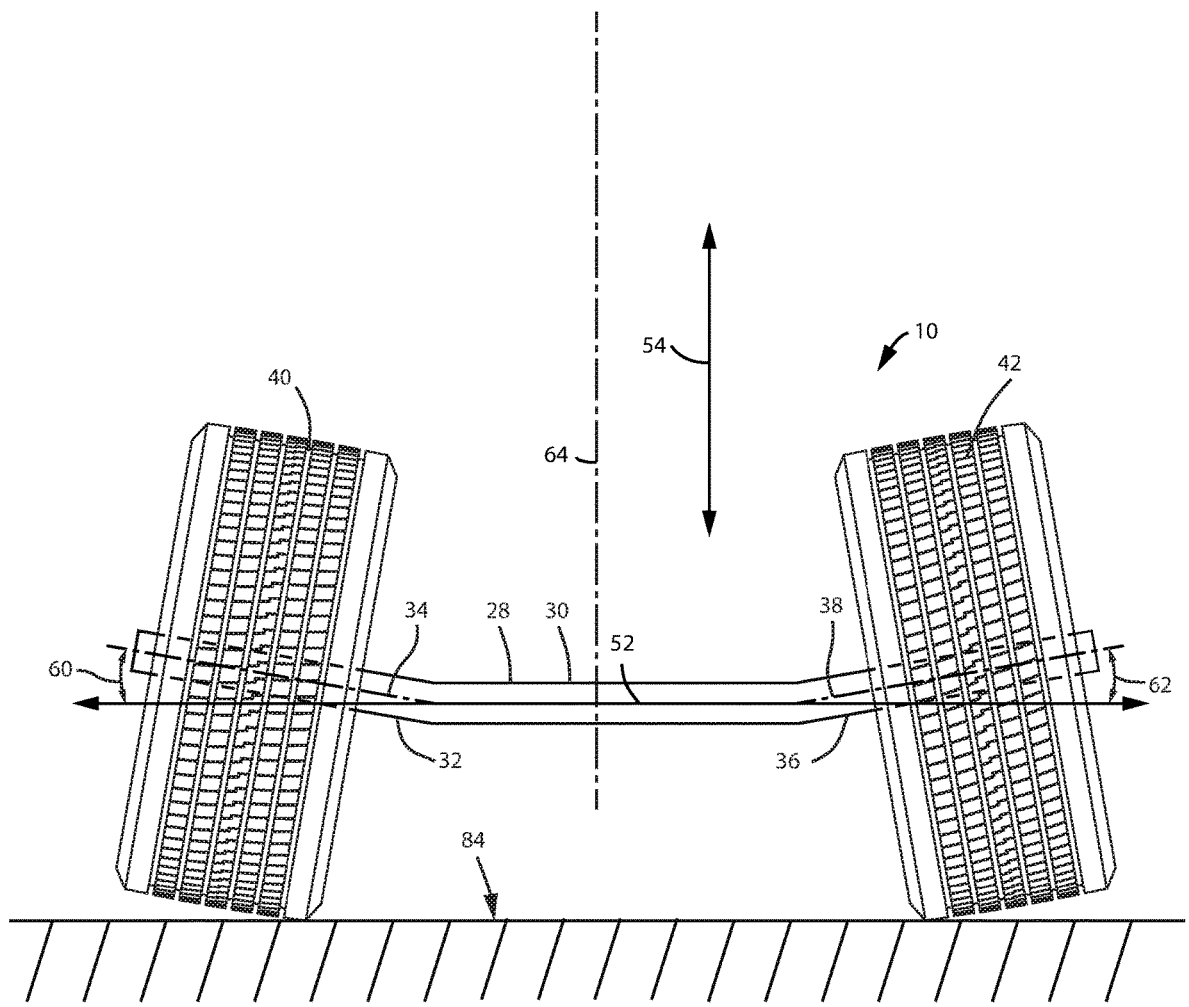
FIG. 7 is a back view of a rearward axle of a trailer that has third and fourth wide base tires in accordance with another exemplary embodiment.

FIG. 7 shows an alternate embodiment, also not to scale, of the apparatus 10 and in particular the rearward axle 28. The view is from behind the rearward central body 30 looking forward in the longitudinal direction 50. The angle 60 and the angle 62 are both negative angles in this embodiment and the tires 40 and 42 have negative camber. As explained, negative angles 60 and 62 cause the axes 34 and 38 to have a component of extension upward in the vertical direction 54 away from the ground 84 as they extend outboard in the lateral direction 52 from the rearward central body 30.

The angles 56, 58, 60 and 62 are shown as causing the tires 24, 26, 40 and 42 to be oriented at the same angle magnitude they are oriented at relative to the ground 84. In this regard camber sleeves, hubs, and other components do not adjust the angle of the tires 24, 26, 40 and 42 to the ground 84 or lateral direction 52. Instead, all of the angular orientation of the tires 24, 26, 40 and 42 is supplied via the angular orientation of the axes 18, 22, 34 and 38 relative to the lateral direction 52. As such, embodiments exist in which sleeves to adjust the angle of the tires are not present on the forward axle 12 and rearward axle 28. In some instances, all of the tires 24, 26, 40 and 42 are angled relative to the ground 84 so that the bottoms of the tires 24, 26, 40, 42 are inboard in the lateral direction 52 relative to the tops of the tires 24, 26, 40, 42 as defined by the vertical direction 54. The forward and rearward axles 12, 28 can be arranged so that only the four tires 24, 26, 40, 42 are carried by the axles 12 and 28 and no other tires are on the axles 12 and 28. The apparatus 10 is associated only with the trailer 48 and not the tractor 46. The apparatus 10 can be for use with a high ply steer tire 66. In this regard the tires 24, 26, 40, 42 are high ply steer tires that pull one way in the lateral direction 52 during driving. In some instances all of the tires 24, 26, 40, 42 pull in the lateral direction 52 towards the center of the road as the trailer 48 is driven in the right hand lane of the road.

The mounting portions 16, 20, 32, 36 are shown as being angled upon their initial extension from the central bodies 14, 30 and keeping the same angle 56, 58, 60, 62 along their entire lengths from the central bodies 14, 30 to their terminal ends. However, the angles 56, 58, 60, 62 may be located on only a portion of the length of the mounting portions 16, 20, 32, 36 in which other parts or lengths of the mounting portions 16, 20, 32, 36 do not exhibit the angles 56, 58, 60, 62 but are angled different amounts from those shown.

The forward and rearward axles 12, 28 can be made by forming a hollow tube with solid ends so that the hollow tube makes up the forward and rearward central bodies 14, 30. Brackets could be welded onto the solid ends to form the mounting portions 16, 20, 32, 36. The angles 56, 58, 60, 62 could be formed in a variety of manners into the axles 12, 28. For example, one manner of manufacture could be bending of the axles 12, 28 after they are formed. Additionally or alternatively, the axles 12, 28 could be distorted with welding or heating to form the angles 56, 58, 60, 62. Still further, the angles 56, 58, 60, 62 could be formed by machining in other embodiments. It is to be understood that the angles 56, 58, 60, 62 could be imparted into the axles 12, 28 in a variety of manners in other embodiments. The axles 12, 28 include their angles 56, 58, 60, 62 from being formed with the angles 56, 58, 60, 62 and not through a subsequent, add-on sleeve or other component added onto the axles 12, 28 after their manufacture and placement onto a trailer 48.

The angles 56, 58, 60, 62 are specific to their particular wheel position and have been optimized by applicant in order to result in wide base tires 24, 26, 40, 42 in those positions that have irregular wear properties reduced as much as possible. Why a specific wheel position of the tire 24, 26, 40, 42 would have a specific angle 56, 58, 60, 62 is not an obvious matter of design. There are many interactions between the road surface, slope of the road, the type of suspension of the trailer 48 and its design characteristics, the compliance of the axles 12 and 28, the camber thrust of the tires, the ply steer of the tires, traffic lane rules, road intersection and interstate exit/entrance layout, and human driver characteristics that all add up to result in the particular wear patterns seen on the differently positioned wide base tires 24, 26, 40, 42. Applicant theorizes that the different wheel positions will require a different camber angle 56, 58, 60, 62 because each wheel position experiences its own unique wear pattern. As an example, when the tractor trailer 44 makes a tight right hand turn at low speeds in an intersection the left rear tire, in our case the third wide base tire 40, experiences more wear than the rest of the trailer 48 tires 24, 26, 42. The vast majority of the interstate exits require hard right hand turns at fast speeds and these turns likewise are harder on the third wide base tire 40 at the left rear position of the trailer 48. When making a left hand turn through an intersection, the tractor trailer 44 executes this turn at higher speeds and in a wider manner that is more damaging to the right rear trailer 48 tire which in our case is the fourth wide base tire 42. Usually when a driver backs up a tractor trailer 44, the driver nearly always tends to want to do so by turning the tractor 46 to the left relative to the trailer 48 to avoid a blind spot. This method of backing up puts greater wear on the right front trailer tire which is our described second wide base tire 26. Additionally, the use of a high ply steer tire such as those previously described with reference to the tire of FIG. 1 introduces even more irregular wear into the equation and this irregular wear may not be evenly distributed to all four tire 26, 28, 40, 42 positions due to these positions themselves experiencing more or less irregular wear.

Experiments Carried Out in Accordance with Various Embodiments of the Invention

Experiments were conducted in accordance with various exemplary embodiments to determine whether the provision of the angles 56, 58, 60, 62 specified will reduce irregular wear of the wide base tires 24, 26, 40, 42. The trailer 48 used in the experiments included forward and rearward axles 12, 28 that were Hendrickson LDA axles supplied by Hendrickson USA, L.L.C. having offices located 800 South Frontage Road, Woodridge, Illinois, USA. The tires used were the same and were MICHELIN® X ONE® tires, and in particular X ONE® LET (Line Energy T) tires. These tires have relatively high amounts of ply steer. The positions as noted in the experimental results TABLE 1 below have the forward left tire position being the first wide base tire 24, the forward right position being the second wide base tire 26, the rearward left position being the third wide base tire 40, and the rearward right position being the fourth wide base tire 42. The tires were run for variously identified miles, some of which were the end of life removal miles of the tire, and then measured for irregular wear. Although irregular wear could be seen on different ones of the tires, for comparison purposes the tread depth and tread feature depth of the tires were measured and provided in the below table. The inside shoulder remaining is the depth of the tread of the tire near the inside shoulder, and the outside shoulder remaining is the depth of the tread of the tire near the outside shoulder of the tire. These are not measurements of the shoulder, but are instead measurements of the tread depth/tread feature depth at different points along the width of the tire one being near the inside shoulder and the other being near the outside shoulder. The measurement of tread depth at these two oppositely disposed locations on the tread in the width direction provides an indication as to whether irregular wear is occurring as one side of the tire may show more wear than the opposite side of the tire.

TABLE 1

| Tire position | Angle (degrees) | Inside shoulder remaining (inches) | Outside shoulder remaining (inches) | Mileage when measured |
|---|---|---|---|---|
| Forward Left | 0 | 0/32 | 13/32 | 127,600 |
| Forward Left | +0.85 | 2/32 | 3/32 | 191,900 |
| Forward Left | 0 | 5/32 | 13/32 | 109,900 |
| Forward Left | 0 | 6/32 | 14/32 | 102,200 |
| Forward left | +0.85 | 10/32 | 9/32 | 118,300 |
| Forward Left | +0.85 | 8/32 | 8/32 | 111,400 |
| Forward Right | 0 | 2/32 | 3/32 | 137,900 |
| Forward Right | +0.18 | 0/32 | 0/32 | 191,900 |
| Forward Right | 0 | 6/32 | 9/32 | 109,900 |
| Forward Right | 0 | 8/32 | 10/32 | 102,200 |
| Forward Right | +0.18 | 8/32 | 8/32 | 108,400 |
| Forward Right | +0.18 | 7/32 | 8/32 | 118,300 |
| Rearward Left | 0 | 4/32 | 14/32 | 88,400 |
| Rearward Left | +0.75 | 0/32 | 3/32 | 191,900 |
| Rearward Left | 0 | 2/32 | 9/32 | 122,600 |
| Rearward Left | 0 | 6/32 | 12/32 | 102,300 |
| Rearward Left | +0.75 | 8/32 | 8/32 | 108,400 |
| Rearward Left | +0.75 | 8/32 | 7/32 | 118,300 |
| Rearward Right | 0 | 0/32 | 0/32 | 137,900 |
| Rearward Right | +0.05 | 0/32 | 0/32 | 191,900 |
| Rearward Right | 0 | 3/32 | 4/32 | 122,600 |
| Rearward Right | 0 | 5/32 | 9/32 | 98,100 |
| Rearward Right | +0.05 | 6/32 | 8/32 | 118,300 |
| Rearward Right | +0.05 | 8/32 | 9/32 | 90,200 |

The results of the experiments showed that providing the angles 56, 58, 60, 62 as indicated resulted in reduction of irregular wear. It is to be understood that the angles listed are put into the axles 12 and 28 before loading of the axles 12, 28 and before weight of the trailer 48 is put onto the axles and before the trailer 48 is loaded with cargo. There could be a tolerance range put into the numbers because manufacturing of the axles 12, 28 may not be completely precise in all embodiments. The tolerancing error is plus or minus 0.05 degrees. These numbers and the tolerancing range are disclosed herein. Applicants were surprised that these small changes in camber at different amounts for all four different tire positions resulted in the results achieved in irregular wear reduction. Applicant's theorize that expansion of the range from that of the base number to plus or minus 0.10 degrees will also result in improved irregular wear reduction but not at much as would be the case if the 0.05 degree tolerance range were respected. The angles 56, 58, 60, 62 that are established can all be different so that none of them are of the same magnitude, although they all may be positive angles.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. An apparatus, comprising:
    a forward axle having a forward central body, a first forward mounting portion configured for receiving a first wide base tire, and a second forward mounting portion configured for receiving a second wide base tire;
    a rearward axle having a rearward central body, a first rearward mounting portion configured for receiving a third wide base tire, and a second rearward mounting portion configured for receiving a fourth wide base tire;
    wherein the forward axle and the rearward axle are configured for being received on a trailer of a tractor trailer, wherein the trailer has a longitudinal direction, a lateral direction, and a vertical direction, wherein the forward axle is configured for being located forward of the rearward axle in the longitudinal direction;
    wherein the first forward mounting portion has a first forward mounting portion axis about which the first wide base tire is configured to rotate, wherein the first forward mounting portion axis is oriented at an angle from +0.75 to +0.95 degrees to the lateral direction, wherein a + angle is one in which the first forward mounting portion axis has a component of extension downward in the vertical direction as the first forward mounting portion axis extends outboard in the lateral direction;
    wherein the second forward mounting portion has a second forward mounting portion axis about which the second wide base tire is configured to rotate, wherein the second forward mounting portion axis is oriented at an angle from +0.08 to +0.28 degrees to the lateral direction, wherein a + angle is one in which the second forward mounting portion axis has a component of extension downward in the vertical direction as the second forward mounting portion axis extends outboard in the lateral direction;
    wherein the first rearward mounting portion has a first rearward mounting portion axis about which the third wide base tire is configured to rotate, wherein the first rearward mounting portion axis is oriented at an angle from +0.65 to +0.85 degrees to the lateral direction, wherein a + angle is one in which the first rearward mounting portion axis has a component of extension downward in the vertical direction as the first rearward mounting portion axis extends outboard in the lateral direction;
    wherein the second rearward mounting portion has a second rearward mounting portion axis about which the fourth wide base tire is configured to rotate, wherein the second rearward mounting portion axis is oriented at an angle from −0.05 to +0.15 degrees to the lateral direction, wherein a + angle is one in which the second rearward mounting portion axis has a component of extension downward in the vertical direction as the second rearward mounting portion axis extends outboard in the lateral direction.

2. The apparatus as set forth in claim 1, wherein the first, second, third and fourth wide base tires each comprising:
    a circumferential direction and a radial direction;
    a first bias ply;

a second bias ply having a different orientation to the circumferential direction as compared to the first bias ply; and a circumferential belt layer having belts extending in the circumferential direction oriented at a zero degree angle to the circumferential direction, wherein the circumferential belt layer is located between the first bias ply and the second bias ply in the radial direction.

3. The apparatus as set forth in claim 2, wherein the different orientation between the first bias ply and the second bias ply includes belts having the same magnitude as one another relative to the circumferential direction but directions opposite to one another relative to the circumferential direction.

4. The apparatus as set forth in claim 2, wherein the first, second, third and fourth wide base tires each comprising:
a third bias ply;
a full-width protector belt ply;
a radial ply.

5. The apparatus as set forth in claim 1, wherein the first, second, third and fourth wide base tires are each a MICHELIN® X ONE® tire.

6. The apparatus as set forth in claim 1, wherein the first wide base tire is configured to be oriented at an angle from +0.80 to +0.90 degrees to the lateral direction via only the orientation of the first forward mounting portion axis to the lateral direction;
wherein the second wide base tire is configured to be oriented at an angle from +0.13 to +0.23 degrees to the lateral direction via only the orientation of the second forward mounting portion axis to the lateral direction;
wherein the third wide base tire is configured to be oriented at an angle from +0.70 to +0.80 degrees to the lateral direction via only the orientation of the first rearward mounting portion axis to the lateral direction;
wherein the fourth wide base tire is configured to be oriented at an angle from +0.00 to +0.10 degrees to the lateral direction via only the orientation of the second rearward mounting portion axis to the lateral direction; and
wherein sleeves and hubs are not used to modify the orientation angles of the first, second, third and fourth wide base tires to the lateral direction.

7. The apparatus as set forth in claim 1, wherein the first, second, third and fourth wide base tires are all configured to be oriented relative to the vertical direction so that the tops of the first, second, third and fourth wide base tires are configured to be located outboard from the bottoms of the first, second, third and fourth wide base tires in the lateral direction.

8. The apparatus as set forth in claim 1, wherein the forward axle receives the first and second wide base tires and does not receive any more tires than the first and second wide base tires; and
wherein the rearward axle receives the third and fourth wide base tires and does not receive any more tires than the third and fourth wide base tires.

9. The apparatus as set forth in claim 1, wherein the trailer has a payload capacity of 4,000 pounds or greater.

10. The apparatus as set forth in claim 1, wherein the first forward mounting portion axis is oriented at an angle of +0.85 degrees to the lateral direction, wherein the second forward mounting portion axis is oriented at an angle of +0.18 degrees to the lateral direction, wherein the first rearward mounting portion axis is oriented at an angle of +0.75 degrees to the lateral direction, wherein the second rearward mounting portion axis is oriented at an angle of +0.05 degrees to the lateral direction.

11. The apparatus as set forth in claim 1, wherein the trailer is on ground and the lateral direction is parallel to the ground onto which the trailer is on such that the lateral direction is perpendicular to a surface normal extending from the ground.

* * * * *